United States Patent Office 3,179,446
Patented Apr. 20, 1965

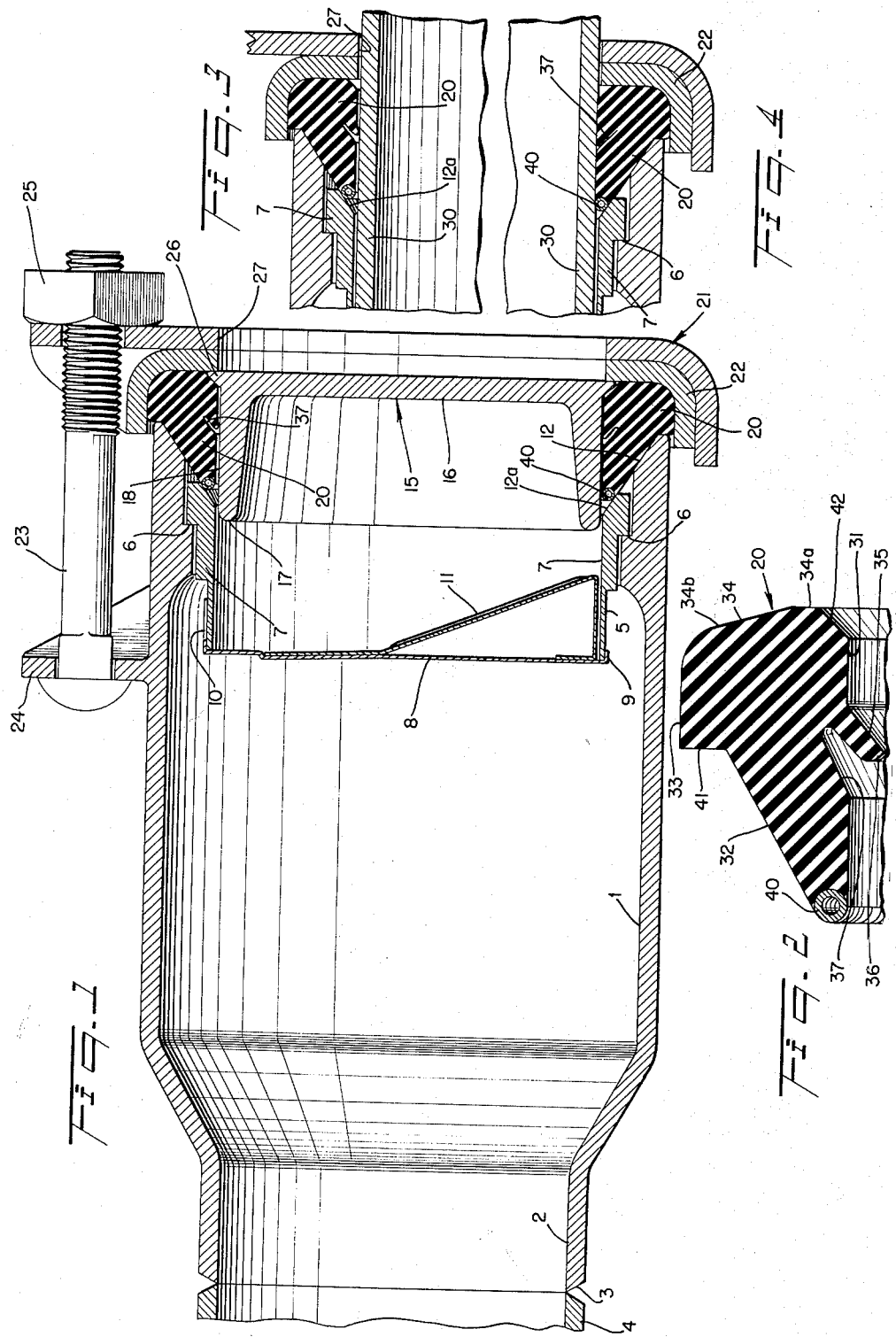

3,179,446
EXTENSION FITTING HAVING INITIAL FLEXIBLE
LIP SEAL GASKET
Robert N. Paterson, Bradford, Pa., assignor to Dresser
Industries, Inc., Dallas, Tex., a corporation of Delaware
Filed Nov. 4, 1963, Ser. No. 321,247
4 Claims. (Cl. 285—110)

This is a continuation in part of my application Serial No. 800,317 filed March 18, 1959, now abandoned.

The present invention relates to pipe joints and more particularly to pipe joints having gaskets of deformable material and means for applying pressure to the gaskets to obtain a fluid-tight seal.

Known pipe joints of the pressure sealing type ordinarily comprises a sleeve or body portion shaped to provide a bore for receiving a plain end pipe. The joint has a gasket recess for an annular gasket surrounding the pipe. An annular deformable gasket, for example of elastomer material, is positioned in the gasket recess. The joint comprises a follower movable toward the body portion, for example by means of nuts on bolts, to apply pressure to the gasket. Even though the elastomer material of the gasket is relatively firm, it tends to flow somewhat like a fluid when pressure is applied to it. The application of pressure causes the gasket material to be pressed into close contact with the pipe to provide a permanent pressure seal.

Frequently for convenience in installing joints of this kind, pipe couplings including the body portion, gasket and follower are preassembled, for example at the factory. The method of making up the pipe joint with a preassembled coupling consists of stabbing a plain end pipe through the annular gasket into the body portion and tightening the follower to provide a permanent seal. When the coupling is thus tightened, the pipe is gripped tightly and relative movement between the pipe and coupling body is prevented.

Sometimes it is desirable to provide an initial temporary seal before the coupling is tightened. This is desirable, for example, when connecting new services to a main that is already in use and under pressure or when extending such a main. Pressure type seals of the kind heretofore available have not been satisfactory for such use since a seal is not effected until the coupling is tightened. After the coupling has been tightened a seal is effected but the pipe cannot be moved relative to the coupling body.

A principal object of the present invention is to provide a pipe joint having an improved gasket construction which provides an initial fluidtight seal while permitting relative axial and angular movement between inner and outer members of the joint. After the coupling has been fully tightened, the joint provides a permanent pressure seal and holds the inner and outer members against relative movement.

The nature, characteristics and advantages of the invention will be more fully understood from the following claims in conjunction with the accompanying drawing which shows by way of example a preferred embodiment of the invention and in which:

FIG. 1 is an axial section of a fitting in accordance with the invention, for closing the end of a pipeline while permitting a subsequent extension of the line;

FIG. 2 is an enlarged cross section of a gasket in the fitting in FIG. 1;

FIGS. 3 and 4 are fragmentary axial sections illustrating successive steps in inserting a pipe section into the fitting to extend an existing pipeline.

The invention is illustrated by way of example incorporated in a fitting that is adapted to be used to provide a closure at the end of a gas main or other pipeline while permitting extension of the line at a later date without interruption of service. The term "elastomer material" is herein used generically to designate natural rubber compositions and also synthetic compositions having similar characteristics and properties.

The fitting, according to the invention, is shown as comprising a tubular body portion or sleeve 1 having a reduced inner end portion 2 provided, for example, with a beveled end 3 adapted to be welded to a pipe section 4. The sleeve 1 is provided with a collar or bushing 5 which fits into an outer or free end of the sleeve and seats on a shoulder 6 formed internally of the sleeve. The shoulder 6 limits the inward axial travel of the bushing and defines its axial position close adjacent to the outer end of the sleeve 1. The bushing 5 is secured in place, for example by welding, and has an inner cylindrical bore 7 of a diameter dimensioned to receive freely another pipe section as will be described below. The bushing 5 has its inner end closed by a diaphragm or seal 8 having a rim portion 9 fitting over the bushing and an integral tab or hinge portion 10 affixed to the bushing at one side. The diaphragm has an inclined ramp or strip 11 extending radially of the diaphragm and at an angle to it. The diaphragm 8 is made, for example of sheet metal or plastic, of a material having sufficient thickness and strength to withstand—at least temporarily— the intended pressure of gas or other fluid in the pipe 4.

The inner surface of the sleeve 1 adjacent its outer end is beveled outwardly as indicated at 12 to provide a conical face. The bushing 5 is also provided with an outer end having a conical or beveled face 12a forming a continuation of the conical face 12 of the sleeve 1. A removable closure member 15 is disposed inserted into the bore of the bushing 5. The closure member has an end wall 16 and an annular skirt portion 17 which fits freely into the bushing 5 and has an outer cylindrical surface 18. The cylindrical outer surface of the closure member 15 cooperates with the conical or beveled surfaces 12 and 12a of the sleeve 1 and bushing 5 to define an annular gasket recess for receiving an annular gasket 20 of elastomer material. The gasket 20 is shown extending axially beyond the end of the sleeve 1 and is engaged by an annular follower 21 having a skirt portion 22 which embraces and confines the outwardly extending portion of the gasket. Means are provided for moving the follower toward the sleeve 1 to apply pressure to the gasket 20. In smaller size couplings this is conveniently done by interengaging threads on the sleeve and follower. For larger couplings the follower is drawn toward the sleeve by means of a plurality of threaded bolts 23 anchored by integral lug or ear portions 24 on the sleeve 1. Four bolts are provided with nuts 25 for adjustably controlling the pressure applied to the gasket. The follower 21 engages a radially projecting flange or lip portion 26 on the closure member 15 so as to hold the closure in place.

When it is desired to extend a gas main or other pipeline provided with a fitting of the kind shown in FIG. 1, the closure 15 is removed from the assembly by removing the follower 21. The follower is then replaced and the nuts 25 of the bolts 23 are screwed down finger tight. Line pressure is retained by the diaphragm 8. A pipe 30 that is to form an extension of the pipeline 4 is then stabbed axially through a pipe aperture 27 of the follower 21 and the annular gasket 20 into the cylindrical bore 7 of the bushing 5 as illustrated in FIG. 3. The end of the pipe 30 engages the ramp 11 of the diaphragm 8 and it thereby breaks the diaphragm loose from the bushing 5 beginning at a point opposite the hinge portion 10. The diaphragm 8 swings about the hinge portion 10 into a position permitting the pipe 30 to be inserted substantially the full axial depth into the sleeve 1 thereby holding the diaphragm out of line-blocking position. The diaphragm made is sufficiently light material to bend as required to conform to the curvature of the sleeve and thereby permit insertion of the pipe 30.

In accordance with the invention, the gasket 20 is of a configuration and internally dimensioned to cooperate with the sleeve 1 and pipe 30 to provide an initial fluidtight seal when the pipe is being inserted, while permitting relative movement of the pipe and sleeve. When the installation has been completed and the joint is fully made up the gasket cooperates with the other parts of the fitting to provide a permanent pressure seal and to hold the pipe 30 against movement relative to the sleeve 1. The gasket 20 comprises a ring formed of natural or synthetic rubber composition or other elastomer material which is relatively firm and yet capable of "flowing" under high pressure. The durometer of the elastomer material forming the gasket is preferably of the order of 70 to 80.

In free condition (FIG. 2) the gasket 20 is generally trapezoidal in cross section with an inner substantially cylindrical surface 31, a conical or beveled outer surface 32, a substantially cylindrical outermost surface 33 and a radially extending outer end face 34. The cylindrical surface 31 has a diameter slightly greater than the outside diameter of the pipe so that the surface 31 forms a cylindrical bore that receives the pipe 30 freely but with a fairly close fit. It will be noted that the pipe 30 likewise fits freely into the cylindrical bore 7 of the bushing 5, the inside diameter of the cylindrical bore of the gasket being approximately equal to that of the bushing. The conical face 32 of the gasket 20 is inclined at approximately the same angle as the conical or beveled surface 12 of the sleeve 1, for example about 30 degrees. The diameter of the outermost cylindrical surface 33 of the gasket is approximately the same as the inside diameter of the skirt 22 of the follower 21 which in turn slides freely over the outside of the end portion of the sleeve 1 (FIG. 1). The end surface 34 of the gasket is shown as comprising an annular portion 34a which is disposed at the heel of the gasket and is approximately perpendicular to the axis of the gasket and an outer portion 34b which is conical with an inclination of approximately 15 degrees to the axis of the gasket.

Intermediate the ends of the cylindrical bore formed by the inner surface 31, the gasket is provided with an integral, annular flange or lip 35 which extends axially and radially inwardly from the cylindrical surface 31 and is inclined relative to the axis of the bore of said body portion. The angle of inclination is preferably of the order of 30 to 60 degrees and is shown as being approximately 45 degrees. The lip 35 terminates in an inner edge angular tip 36 which defines a circle having a diameter materially less than the outside diameter of the pipe 30. In the manufacture of pipe by commercial methods there is a permissible variation between maximum size pipe and minimum size pipe, all of the same nominal size. The inside diameter of the cylindrical bore defined by the surface 31 of the gasket is slightly larger than maximum size pipe. The diameter of the circle defined by the tip 36 of lip 35 should be at least slightly less than the outside diameter of minimum size pipe. Hence when a pipe is stabbed into the fitting with the nuts 25 finger tight, the lip 35 flexes and stretches sufficiently to receive the pipe. By reason of the elasticity of the gasket material the lip 35 engages the pipe to provide a fluidtight seal. However, the pipe is engaged only by the flexible lip 35 and it can be moved axially relative to the fitting to stab the pipe into the sleeve 1 as described above.

Immediately adjacent and axially inwardly of the lip 35 there is provided an oblique annular recess 37 in the inner surface of the gasket. The recess 37 is of approximately the same cross sectional shape and area as the lip 35 so as to permit the lip to retract or fold up into the recess to provide a substantially continuous inner cylindrical surface of the gasket. Hence when the nuts 25 are wrench tightened to apply pressure first to the heel of the gasket causing the outer end portions 34a, 34b to assume a position in which the outer surface 34 is substantially straight and substantially normal to the axis of the bore of said body portion as illustrated in FIG. 4 the lip 35 is received in the gasket 37 and the gasket functions as a pressure type gasket to provide a permanent pressure seal.

In the preferred form shown in the drawings, the gasket 20 is provided at its toe with a small diameter coil spring 40 which is imbedded in the elastomer composition of the gasket and has substantially contiguous convolutions. The spring 40 protects the toe of the gasket and also inhibits flow of gasket material into any space that there may be between the pipe 30 and the bushing 5 particularly with minimum size pipe. The gasket 20 is provided with an annular shoulder 41 which engages the outer end of the sleeve 1 to hold the gasket against being forced axially inwardly of the sleeve when a pipe is being stabbed through the gasket and thereby prevent the gasket from being wedged into engagement with the pipe by reason of the interengagement of the conical face 32 of the gasket with the conical face 12 of the fitting. The gasket preferably has its heel chamfered as indicated at 42 to receive a radially projecting flange 26 of the closure 15 when the latter is in place (FIG. 1) and also to assist in guiding the pipe 30 through the gasket (FIG. 3). By reason of the flow characteristics of the elastomer material, the shoulder 41 does not interfere with pressing the gasket into tight engagement with the pipe when the nuts 25 are drawn up. Moreover, since the radial face of the follower 21 first engages the flat face 34a of the gasket, full gasket pressure on the pipe is assured without excessive bolt tension. Engagement of the flat face of the annular portion 34a allows the radially inwardly directed components of pressure force to be applied without requiring excessive wrench-tightening of the nuts 25. The gasket is more easily deformed to apply the forces necessary for effecting a permanent pressure seal with the gasket.

It will be noted that the gasket is solid except for the small annular recess 37 and is of such shape and size as to substantially fill the gasket recess defined by the outer member or sleeve 1, the follower 21 and an inner member such as the closure member 15 or the pipe 30. Hence when the follower is drawn up tightly so as to apply pressure to the gasket the latter can be put under high pressure so as to provide a permanent fluidtight pressure seal.

It will be understood that the invention is applicable to fittings of various configurations such as ells, tees, sleeves and crosses and that gaskets of the kind herein shown and described are usable in a wide variety of fittings. The invention is in no way limited to the particular embodiment herein shown and described by way of example.

What I claim and desire to secure by Letters Patent is:

1. In a pipe joint, a body portion provided with a free end having a cylindrical bore and a conical gasket-engaging inner surface extending axially and radially outwardly from said bore in a direction toward said free end, an inner member insertable in assembly axially into said bore and having a substantially cylindrical portion fitting freely into said bore, an annular follower surrounding said inner member adjacent said body portion free end and having a substantially radial gasket-engaging surface, said conical surface of said body portion, said radial surface of said follower and an outer surface of said inner member together defining an annular gasket recess circumferentially of said inner member, an annular gasket of elastomer material in said recess, said gasket substantially filling said recess and having a conical outer surface for engaging said conical surface of the body portion, an outer end face on said gasket comprising at least a substantially radial end surface for engaging said radial surface of the follower and a substantially cylindrical inner surface defining a cylindrical through bore substantially coaxial with said bore of said body portion and receiving said inner member with sufficient play to permit said inner member to slide axially freely in said bore, said gasket having a chamfered inner surface extending axially and radially outwardly from said cylindrical inner surface at the axially-outer end thereof to guide said inner member into said joint, said body portion having an annular shoulder extending radially outwardly from said conical gasket-engaging surface and said gasket having an annular shoulder engaging said shoulder of the body portion to restrain movement of said gasket in a direction axially inwardly of said body portion, said gasket having in said cylindrical surface an oblique inner surface defining an oblique annular recess having a radially inner end intermediate the ends of said gasket and substantially spaced axially therefrom, and a single, flexible, integral, annular lip disposed axially outwardly of and immediately adjacent said recess, said lip being substantially spaced axially from the ends of said gasket and in a free condition said lip projecting axially and radially inwardly into said cylindrical bore of said gasket and terminating in a thin tip portion defining a ring which is smaller in internal diameter than the outer diameter of said cylindrical portion of said inner member and fluid-tightly engages said cylindrical portion of said inner member upon insertion of said inner member in said body portion bore when said joint is assembled to provide an initial fluid-tight seal on the outer surface of said inner member while permitting axial movement of said inner member relative to said body portion, said lip being deflectatble into said recess for engaging said oblique inner surface of said gasket defining said recess to cause said lip portion to apply pressure to said cylindrical portion of said inner member to provide a permanent fluid-tight pressure seal, and means to adjustably position said follower radial surface axially relative to said body portion to reduce the axial cross-sectional area of said gasket recess and thereby apply axially directed pressure to said gasket to press said lip against said oblique surface defining said recess and cause said lip and said cylindrical surface of said gasket to press tightly into engagement with said cylindrical portion of the inner member to provide said permanent pressure seal, said lip having an inner surface and a cross-section substantially equal to that of said annular recess in the cylindrical surface of said gasket and being wholly received in said recess when pressure is applied to said gasket to provide a substantially continuous cylindrical gasket surface engaging said inner member and composed of said lip inner surface and portions of said first-named cylindrical surface on both axial sides of said lip when said gasket is under a given axially directed pressure.

2. In a pipe joint, a body portion provided with a free end having a cylindrical bore and a conical gasket-engaging inner surface extending axially and radially outwardly from said bore in a direction toward said free end, an inner member insertable in assembly axially into said bore and having a substantially cylindrical portion fitting freely into said bore, an annular follower surrounding said inner member adjacent said body portion free end and having a substantially radial gasket-engaging surface, said conical surface of said body portion, said radial surface of said follower and an outer surface of said inner member together defining an annular gasket recess circumferentially of said inner member, an annular gasket of elastomer material in said recess, said gasket substantially filling said recess and having a conical outer surface for engaging said conical surface of the body portion, an outer end face on said gasket comprising a substantially radial end surface for engaging said radial surface of the follower first and an outer inwardly inclined annular surface disposed outwardly of said radial end surface for engaging said radial surface of said follower subsequent to engagement by said end surface when said follower is moved axially toward said body portion to apply axially directed pressure to said gasket, said gasket having a substantially cylindrical inner surface defining a cylindrical bore substantially coaxial with said bore of said body portion and receiving said inner member with sufficient play to permit said inner member to slide axially freely in said bore, said body portion having an annular shoulder extending radially outwardly from said conical gasket-engaging surface and said gasket having an annular shoulder engaging said shoulder of the body portion to restrain movement of said gasket in a direction axially inwardly of said body portion, said gasket having in said cylindrical surface an oblique inner surface defining an oblique annular recess having a radially inner end intermediate the ends of said gasket and substantially spaced axially therefrom, and a single, flexible, integral, annular lip disposed axially outwardly of and immediately adjacent said recess, said lip being substantially spaced axially from the ends of said gasket and in a free condition said lip projecting axially and radially inwardly into said cylindrical bore of said gasket and terminating in a thin tip portion defining a ring which is smaller in internal diameter than the outer diameter of said cylindrical portion of said inner member and fluid-tightly engages said cylindrical portion of said inner member upon insertion of said inner member in said body portion bore when said joint is assembled to provide an initial fluid-tight seal on the outer surface of said inner member while permitting axial movement of said inner member relative to said body portion, said lip being deflectable into said recess for engaging said oblique inner surface of said gasket defining said recess to cause said tip portion to apply pressure to said cylindrical portion of said inner member to provide a permanent fluid-tight pressure seal, and means to adjustably position said follower radial surface axially relative to said body portion to reduce the axial cross-sectional area of said gasket recess and thereby apply axially directed pressure to said gasket to press said lip against said oblique surface defining said recess and cause said lip and said cylindrical surface of said gasket to press tightly into engagement with said cylindrical portion of the inner member to provide said permanent pressure seal, said lip having an inner surface and a cross-section substantially equal to that of said annular recess in the cylindrical surface of said gasket and being wholly received in said recess when pressure is applied to said gasket to provide a substantially continuous cylindrical gasket surface engaging said inner member and composed of said lip inner surface and portions of said first-named cylindrical surface on both axial sides of said lip when said gasket is under a given axially directed pressure.

3. A gasket comprising a generally trapezoidal body portion made of a deformable material and having an axial, cylindrical through bore said gasket having a conical outer surface extending from an annular toe of said gasket axially in a direction toward an outer end face of said gasket, said gasket having a radial shoulder intermediate said conical outer surface and said outer end face, said conical outer surface diverging away from said toe in a direction toward said shoulder, said gasket having a cylindrical outermost surface extending between said shoulder and said outer end face, said outer face comprising a substantially radial end annular surface adjacent said bore and an annular inclined surface outwardly of said radial end surface extending to said outermost surface and inclined relative to said radial end surface in a direction toward said toe, said body portion comprising an oblique surface in said bore defining an oblique annular recess having a radially inner end intermediate the toe and outer end face of said gasket and substantially spaced axially therefrom, and a single, flexible, integral, annular lip disposed axially outwardly of and immediately adjacent said recess, said lip being substantially spaced axially from the toe and said end face of said gasket and in a free condition said lip projecting axially and radially inwardly into said cylindrical bore of said gasket and terminating in a thin tip portion defining a ring which is smaller in internal diameter than the diameter of said through bore, said lip being deflectable into said recess for engaging said oblique inner surface defining said recess, said lip having an inner surface and a cross-section substantially equal to that of said annular recess in the cylindrical surface of said gasket and being wholly receivable in said recess, whereby when said gasket is confined circumferentially other than internally thereof and a longitudinal tubular member is inserted in said through bore having a diameter greater than the internal diameter of said lip and fitting into said bore a fluid-tight seal is effected between said lip and said member and relative movement between said lip and said member can be effected and when a given axially directed pressure is applied to said end face of said gasket with said gasket in a confined condition and said member in said bore said lip inner surface presses against said oblique surface and causes at least said lip to press against said member to provide a permanent pressure seal while said axially directed pressure is applied and relative movement between said gasket and said member is precluded.

4. For use in a pipe joint a main extension fitting having, in combination, a body portion provided with a free end having a cylindrical bore and a conical gasket-engaging inner surface extending axially and radially outwardly from said bore in a direction toward said free end, a removable inner member insertable in assembly axially into said bore closing said bore and having a substantially cylindrical portion fitting freely into said bore, an annular follower having a skirt surrounding said inner member adjacent said body portion free end and having a substantially radial gasket-engaging surface, said conical surface of said body portion, said radial surface and said skirt of said follower and an outer surface of said inner member together defining an annular gasket recess circumferentially of said inner member, an annular gasket of elastomer material in said recess, said gasket substantially filling said recess and having a conical outer surface for engaging said conical surface of said body portion, an outer end face on said gasket comprising a substantially radial end surface for engaging said radial surface of the follower first and an outer inwardly inclined annular surface disposed outwardly of said radial end face for engaging said radial surface of said follower subsequent to engagement by said radial end surface when said follower is moved axially toward said body portion to apply axially directed pressure to said gasket, said gasket having a substantially cylindrical inner surface defining a cylindrical through bore substantially coaxial with said bore of said body portion and receiving said inner member with sufficient play to permit said inner member to slide axially freely in said bores, said body portion having an annular shoulder extending radially outwardly from said beveled gasket-engaging surface and said gasket having means for precluding wedging of said gasket in said body portion upon removal of said inner member and insertion of a pipe extension in place thereof comprising an annular shoulder engaging said shoulder of the body portion to restrain movement of said gasket in a direction axially inwardly of said body portion, said gasket having in said cylindrical surface an oblique inner surface defining an oblique annular recess having a radially inner end intermediate the ends of said gasket and substantially spaced axially therefrom, and a single, flexible, integral, annular lip disposed axially outwardly of and immediately adjacent said recess, said lip being substantially spaced axially from the ends of said gasket and in a free condition said lip projecting axially and radially inwardly into said cylindrical bore of said gasket and terminating in a thin tip portion defining a ring which is smaller in internal diameter than the outer diameter of said cylindrical portion of said inner member and said pipe extension and fluid-tightly engages said cylindrical portion of said inner member and said pipe extension upon insertion of said inner member or said pipe extension in said body portion bore when said joint is assembled to provide an initial fluid-tight seal on the outer surface of said inner member and said pipe extension while permitting axial movement of said inner member and said pipe extension relative to said body portion, said lip being deflectable into said recess for engaging said oblique inner surface of said gasket defining said recess to cause said tip portion to apply pressure to said cylindrical portion of said inner member and said pipe extension to provide a permanent fluid-tight pressure seal, and means to adjustably position said follower radial surface axially relative to said body portion to reduce the axial cross-sectional area of said gasket recess and thereby apply axially directed pressure to said gasket to press said lip against said oblique surface defining said recess and cause said lip and said cylindrical surface of said gasket to press tightly into engagement with said cylindrical portion of the inner member and pipe extension when inserted in said fitting to provide said permanent pressure seal, said lip having an inner surface and a cross-section substantially equal to that of said annular recess in the cylindrical surface of said gasket and being wholly received in said recess when pressure is applied to said gasket to provide a substantially continuous cylindrical gasket surface engaging said inner member and said pipe extension and composed of said lip inner surface and portions of said first-named cylindrical surface on both axial sides of said lip when said gasket is under a given axially directed pressure.

References Cited by the Examiner
UNITED STATES PATENTS

| | | | |
|---|---|---|---|
| 1,924,020 | 8/33 | Bihet. | |
| 1,984,806 | 12/34 | Pfefferle. | |
| 2,021,745 | 11/35 | Pfefferle | 285—113 |
| 2,294,142 | 8/42 | Turner | 285—113 |
| 2,897,533 | 8/59 | Bull | 285—110 |
| 3,036,601 | 6/62 | Fabian | 285—342 |

THOMAS F. CALLAGHAN, *Primary Examiner.*
CARL W. TOMLIN, *Examiner.*